United States Patent
Oom et al.

(10) Patent No.: US 6,738,625 B1
(45) Date of Patent: May 18, 2004

(54) REHOMING AND RESOURCE SHARING IN COMMUNICATIONS NETWORKS

(75) Inventors: Jan Oom, Rimforsa (SE); Pontus Wallentin, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/569,244

(22) Filed: May 11, 2000

(51) Int. Cl.[7] .................................................. H04Q 7/20
(52) U.S. Cl. ..................... 455/453; 455/446; 455/452.2
(58) Field of Search ................................. 455/446, 453, 455/450, 436, 437, 452.1, 452.2, 451

(56) References Cited

U.S. PATENT DOCUMENTS

| | | | |
|---|---|---|---|
| 5,241,685 A | * 8/1993 | Bodin et al. | ................. 455/453 |
| 6,129,604 A | * 10/2000 | Maveddat et al. | .......... 455/453 |
| 6,385,449 B2 | * 5/2002 | Eriksson et al. | ............ 455/436 |
| 6,597,913 B2 | * 7/2003 | Natarajan | .................. 455/12.1 |

FOREIGN PATENT DOCUMENTS

| | | |
|---|---|---|
| EP | 0 858 235 A1 | 8/1998 |
| EP | 0 986 274 A2 | 3/2000 |
| EP | 105155 US | 11/2000 |
| WO | WO 98/08353 | 2/1998 |
| WO | WO 98/09460 | 3/1998 |
| WO | WO 99/45734 | 9/1999 |

* cited by examiner

*Primary Examiner*—Vivian Chin
*Assistant Examiner*—Lewis West (57) ABSTRACT

A method, system, and apparatus enables automatic radio base station (RBS) rehoming from a first radio network controller (RNC) to a second RNC when the first RNC becomes overloaded and/or automatic resource sharing between/among RNCs when one RNC becomes overloaded. A managing/controlling entity receives load measuring reports from RNCs and analyzes them. If a first RNC is frequently and/or constantly experiencing an overcapacity condition, then an RBS of the RNC may be rehomed to a second RNC without operator intervention. If a first RNC temporarily experiences an overcapacity condition, then the workload of the first RNC may be shared by a second RNC also without operator intervention. When rehoming an RBS or sharing a load of a first RNC, ongoing connections are completed by the first RNC where the connection was initiated, but new connections are (for the rehoming case) or new connections may be (for load sharing cases) initiated using a second RNC.

10 Claims, 8 Drawing Sheets

REHOMING AND RESOURCE SHARING IN COMMUNICATIONS NETWORKS

BACKGROUND OF THE INVENTION

1. Technical Field of the Invention

The present invention relates in general to the field of communications networks, and in particular, by way of example but not limitation, to rehoming of radio base stations (RBSes) and to resource sharing in radio network controllers (RNCs) in wireless networks.

2. Description of Related Art

Access to wireless networks is becoming increasingly popular and important for business, social, and recreational purposes. Users of wireless networks now rely on them for both voice and data communications. Additionally, an ever increasing number of users demand both an increasing array of services and capabilities as well as larger and larger service coverage areas. To remedy the congestion caused by additional subscribers and to address demands for larger service coverage areas, network operators constantly strive to increase the size and capacity of their wireless networks. Expanding and improving the infrastructure necessary to provide additional capacity and a larger coverage area is an expensive and manpower-intensive undertaking.

One approach to adding capacity and expanding the coverage area of a wireless network (e.g., to ameliorate congestion resulting from an increasing subscriber base) is to increase the amount of wireless network infrastructure. The infrastructure of wireless networks is composed, in part, of RBSes and RNCs. The RBSes usually include one or more antennas or antenna arrays along with sufficient electronics (e.g., transceivers, control units, etc.) to service mobile stations (MSes) within their respective cell or cells, which typically number one or three per RBS. Each RNC usually controls and routes calls for multiple RBSes; RNCs also provide access to and through the wireless network for the RBSes. One approach to increasing wireless network infrastructure is to therefore add RBSes, and consequently one or more cells for the increasing subscriber base. However, adding RBSes to expand the network can cause RNCs to become overloaded, so one or more RNCs must be added. Once the decision has been made to invest in a new RNC, and the new RNC has been installed, loads frequently become unevenly distributed across the RNCs. As a result, one or more RNCs can become overloaded. RBSes thereafter need to be moved over, or "rehomed", from an old RNC to a new RNC. Conventional rehoming is an intensive, tedious, and time-consuming task that requires reconfiguration of both the radio and the transport networks. The RNCs require a particularly significant amount of reconfiguring, which heavily impacts traffic on connected RBSes.

In existing cellular systems, here exemplified by a system operating in accordance with the Global System for Mobile Communications (GSM) standard, in which Base Station Controllers (BSCs) correspond to RNCs, rehoming procedures require the following operations: (1) verify the hardware configuration in a target BSC by comparing it to the hardware configuration of a source BSC; (2) check if the relevant software version(s) for RBSes are available in the target BSC by comparing them with the registered version(s) in the source BSC; (3) copy the cell data from the source BSC to the target BSC; (4) copy the site data from the source BSC to the target BSC; (5) copy the neighbor cell data from the source BSC to the target BSC; (6) create new external cells data in the source BSC with state "not operating"; (7) create new external cells data in the target BSC with state "not operating"; (8) halt source cell in the source BSC; (9) block transceiver (TRX) resources in the RBS; (10) set old external cells data in the source and target BSC to state "not operating".

With the above "preliminary" measures completed, (11) the operator next requests for the switching connection for the RBS to be moved from the source BSC to the target BSC. The rehoming procedure continues with the following operations: (12) update the Cell Global Identifier (CGI) in the Mobile Services Switching Center (MSC); (13) set new external cells data in the source and target BSCs with state "operating"; (14) de-block TRX resources in the RBS; (15) activate target cell in the target BSC; (16) remove the cell data in the source BSC; (17) remove the site data in the source BSC; (18) remove N-cell data in the source BSC; (19) remove old external cells data in the source BSC; and (20) remove old external cells data in the target BSC.

These twenty (20) operations are performed manually in today's systems. These operations could be automated by a work task support. With the work task support, the operator is guided through the operations and receives support by the system for performing each operation. The work task support will thus ease the burden currently placed on operators by rehoming procedures. Unfortunately, the work task support still suffers from a number of deficiencies. First, rehoming for third generation systems will still impact traffic (e.g., resources have to be blocked). Second, it will require interaction and time from the operator, and it will still permit the operator to introduce human errors. Third, the work task support cannot be used for load sharing. And fourth, the work task support will be complicated.

SUMMARY OF THE INVENTION

The deficiencies of the prior art are overcome by the method, system, and apparatus of the present invention. For example, it would be beneficial if RBSes could be rehomed to a different RNC automatically by the network without operator intervention. Furthermore, as heretofore unrecognized, it would be beneficial if the rehoming could be accomplished without blocking resources by a technique and mechanism that also enables load sharing between RNCs.

In certain embodiments, the present invention enables automatic RBS rehoming from a first RNC to a second RNC when the first RNC becomes overloaded and/or automatic resource sharing between/among RNCs when one RNC becomes overloaded. A managing/controlling entity receives load measuring reports from RNCs and analyzes them. If a first RNC is frequently and/or constantly experiencing an overcapacity condition, then an RBS of the RNC may be rehomed to a second RNC without operator intervention. If a first RNC temporarily experiences an overcapacity condition, then the workload of the first RNC may be shared by a second RNC also without operator intervention.

In other embodiment(s), the managing/controlling entity may determine whether there is an RNC experiencing an overcapacity condition by comparing capacity data included in the load measuring reports to a first predetermined threshold. The capacity data may be at least proportional to the number of connection establishments plus the number of connection releases per unit of time. The managing/controlling entity may determine whether there is an RNC that is a potential target RNC for rehoming an RBS to or for sharing loads with by ascertaining an RBS with link connections to multiple RNCs and determining whether one of the multiple RNCs has excess available capacity. The excess available capacity determination may be based on a comparison between capacity data included in the load measuring reports and a second predetermined threshold.

In still other embodiment(s), automatic RBS rehoming from a first RNC to a second RNC is effectuated by providing (e.g., optionally substantially instantaneous) take over from a resource point of view and a gradual take over of MS connections. For example, after determining that rehoming is to occur, the first RNC sends resource control data for the RBS resources to the second RNC. Thereafter, while ongoing connections are completed by the first RNC, new connections are established by the second RNC.

In still yet other embodiment (s) automatic resource sharing between a first and a second RNC for connections from an RBS that ordinarily are handled by the first RNC is effectuated based on relative levels of capacity and the aforementioned second predetermined threshold. For example, after determining that resource sharing is to occur, ongoing connections are completed through the first RNC, but new connections are typically established through the second RNC. Alternatively, if load balancing so dictates (e.g., the second RNC only has a small portion of excess available capacity and ongoing calls are being disconnected relatively quickly in the RBS), only a portion of the new connections may be established through the second RNC. These and other embodiments and aspects of the present invention are further explained hereinbelow.

The technical advantages of the present invention include, but are not limited to, the following. It should be understood that particular embodiments may not involve any, much less all, of the following exemplary technical advantages.

An important technical advantage of the present invention is that it enables automatic RBS rehoming without involving operators.

Another important technical advantage of the present invention is that it provides the ability to share resources between/among RNCs.

Yet another important technical advantage of the present invention is the ability to improve RBS rehoming inasmuch as operators do not have the ability to introduce errors.

Yet another important technical advantage of the present invention is the ability to optimally rehome RBSes without the need for work task support.

Yet still another important technical advantage of the present invention is that it does not impact in-service performance (ISP).

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method, system, and apparatus of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail.

A preferred embodiment of the present invention and its advantages are best understood by referring to FIGS. 1–9 of the drawings, like numerals being used for like and corresponding parts of the various drawings.

Aspects of GSM systems, as well as the emerging Wideband Code Division Multiple Access (WCDMA) standard, are used to describe embodiments of the present invention. However, it should be understood that the principles of the present invention are applicable to other wireless communication standards (or systems), especially those in which control of radio transceiver stations may be separated from the radio transceiver station sites.

Figure 1:
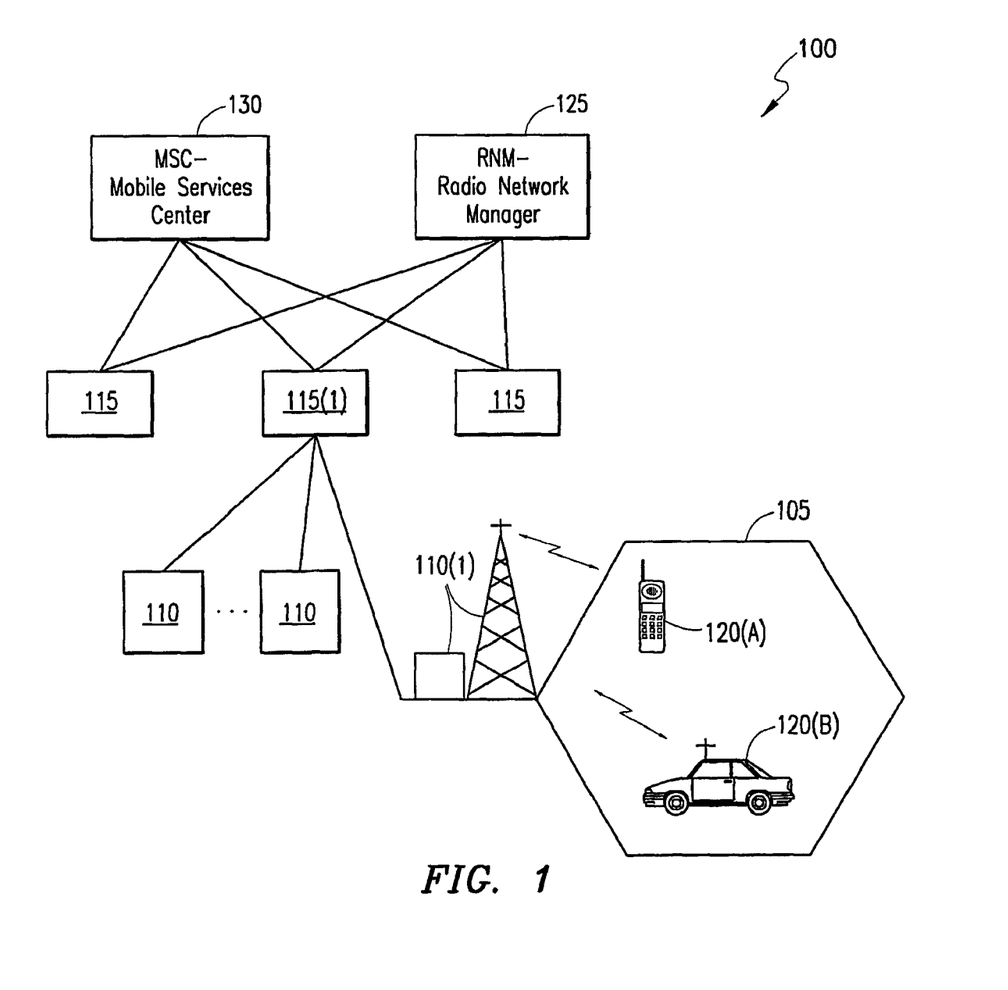
FIG. 1 illustrates an exemplary portion of an exemplary wireless network system with which the present invention may be advantageously practiced.

With reference now to FIG. 1, a portion of an exemplary wireless communications system with which the present invention may be advantageously employed is illustrated generally at 100. The (portion of) wireless communications system 100 includes a cell 105 that is served by an RBS 110(1) (e.g., a base transceiver station (BTS) in GSM) and an RNC 115(1) (e.g., a base station controller (BSC) in GSM). Also shown connected to the RNC 115(1) is a radio network manager (RNM) 125, which is described further hereinbelow with reference to, for example FIG. 2. Within the cell 105 are multiple MSes 120(A) and 120(B), each of which may be in communication with the wireless network infrastructure as represented by the RBS 110(1) and the RNC 115(1). Each MS 120 may be, for example, a handheld cellular phone (e.g., the MS 120(A)), a vehicle-mounted MS (e.g., the MS 120(B)), a data terminal with a wireless link (not specifically shown), etc. While only two MSes 120 are shown in the wireless communications system 100, many more MSes 120 are usually present within the cell 105. Also, it should be noted that the wireless communications system 100 is usually composed of many such cells 105, RBSes 110 (some of which are shown connected to the RNC 115(1)), and RNCs 115 (and potentially multiple RNMs 125).

Figure 2:
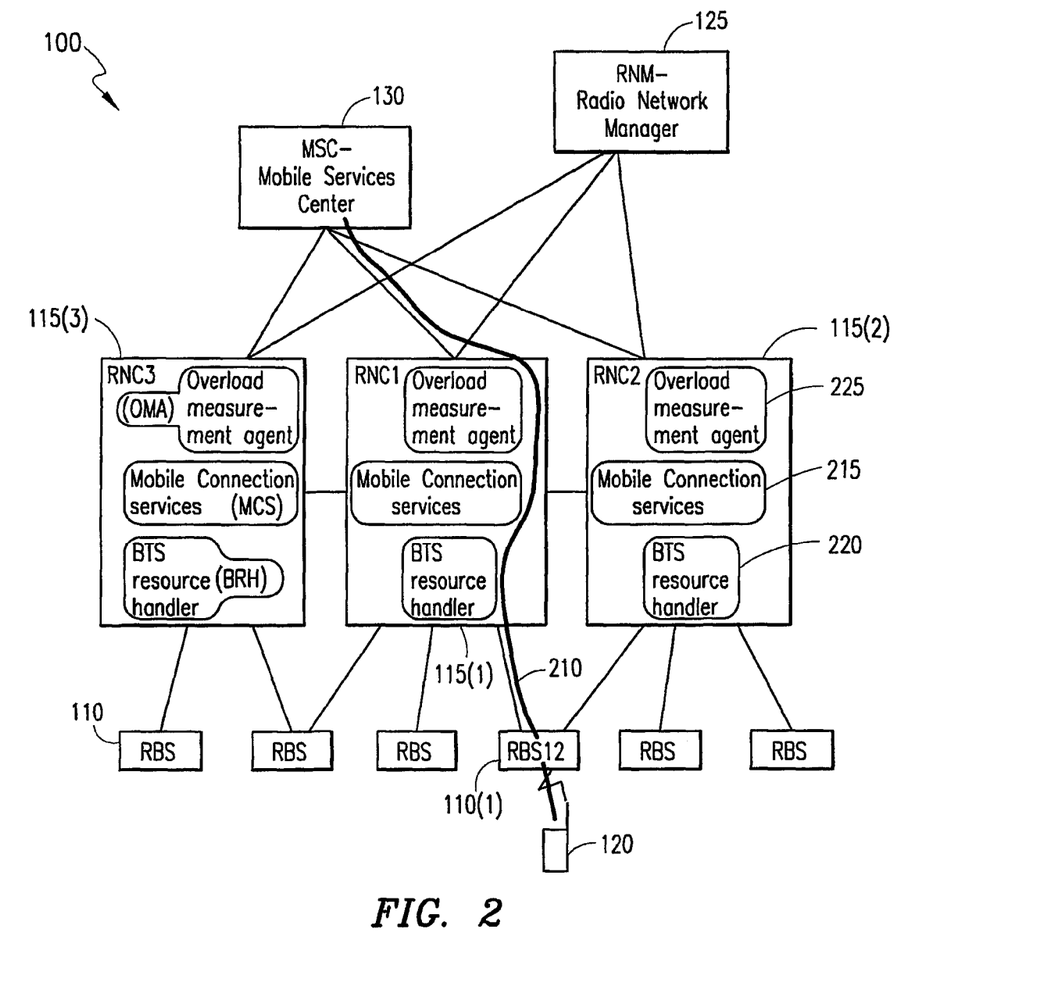
FIG. 2 illustrates another exemplary portion of a wireless network system (of FIG. 1) that enables automatic rehoming and resource sharing in accordance with the present invention.

With reference now to FIG. 2, another exemplary portion of a wireless network system (of FIG. 1) that enables automatic rehoming and resource sharing in accordance with the present invention is illustrated generally at 100. The (portion of) wireless network 100 is illustrated with three RNCs 115(1,2,3) interconnected with each other and to (i) an RNM 125 and (ii) a mobile services center (MSC) 130, as well as multiple RBSes 110. A connection 210 (illustrated as a thick line) extends from an MS 120 and through the RBS12 110(1), the RNC1 115(1), and the MSC 130. It is noted that the "12" portion of the "RBS12" term reflects that the RBS may be switched from being controlled by the RNC1 to being controlled by the RNC2 in accordance with the principles of the present invention. Each RNC 115(1,2,3) may include a mobile connection services (MCS) 215 application part, a BTS resource handler (BRH) 220 application part, and an overload measurement agent (OMA) 225 application part. The MCS 215 controls the radio connection to a specific MS. 120. Specifically, the MCS 215 requests radio resources from the BRH 220 that are needed for a radio connection. In WCDMA, for example, the radio connection is realized by one or several radio channels (e.g., codes) in a number of cells.

The BRH 220, on the other hand, controls an RBS as well as the radio resources for the cells that correspond to that RBS. The BRH 220 also handles the communication link to the RBS and the procedures for configuring the RBS. When the MCS 215 requests a radio resource, the BRH 220 checks to determine whether the requested radio resources are available. A radio resource may be, for example, a code and a data rate to be used by a connection. The OMA 225 is configured to monitor, record, collect, and eventually transmit to the RNM 125 data regarding the consumption of resources in the RNC 115(1,2,3). The data and the transmission thereof is further explained hereinbelow with reference to FIG. 4A. It should be understood that although the connection 210 is illustrated as not passing through any of the MCS 215, the BRH 220, or the OMA 225 so as not to hinder readability of FIG. 2, any one or more of the application parts may have access to, control of, a part in forming, etc. the connection 210. It should also be understood that the MCS 215, the BRH 220, and the OMA 225 are exemplary application parts only; other hardware, software, firmware, some combination thereof, etc. may alternatively be used to implement the principles of the present invention.

Figure 3:
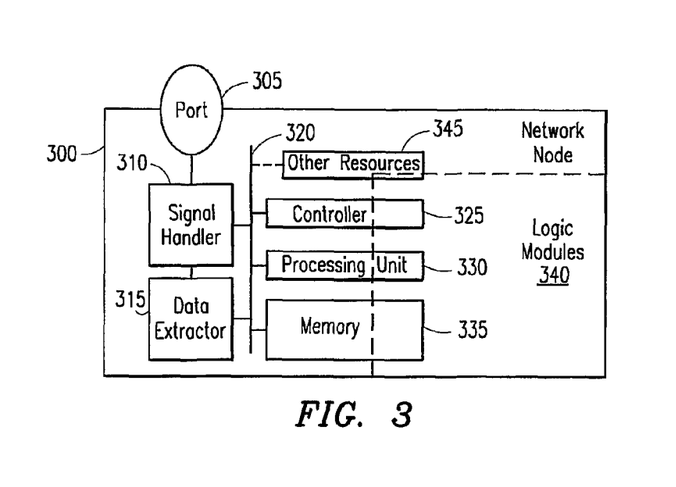
FIG. 3 illustrates an exemplary network node in accordance with the present invention.

With reference now to FIG. 3, an exemplary network node in accordance with the present invention is illustrated at 300. The exemplary network node 300 may correspond to, for example, an RBS 110, an RNC 115, an RNM 125, an MSC 130, etc. A communications port 305 (e.g., an antenna for a wireless link, a wireline connector, etc.) of the network node 300 sends and receives signals and forwards them to signal handler 310 (e.g, a transceiver (TRX), a network adapter device for a wireline link, etc.). The signal handler 310 may forward the signals to a data extractor 315 (e.g., filters, demodulators, protocol interpreters, etc.) for further (e.g., baseband, application level, etc.) processing. The signal handler 310 and the data extractor 315 may be connected to a bus 320, which interconnects various elements of the network-node 300. A controller 325, a processing unit 330, and a memory 335, for example, may also be connected to the bus 320. It should be noted that two separate processors (e.g., a controller 325 and a processing unit 330) are not both necessary for an embodiment of the present invention. Nevertheless, many processors (e.g., one, two, three, or more processors) may alternatively be present and used in accordance with the present invention within the network node 300. These exemplary aspects of the network node 300 may be interconnected and interrelated in manners known to those of ordinary skill in the art to accomplish standard tasks assigned to respective types of network nodes.

The one or more logic modules 340 may also be part of the network node 300. The one or more logic modules 340 may be designed, programmed, etc. to effectuate the principles of the present invention. In other words, the one or more logic modules 340 may be software residing in the memory 335 (or another memory (not shown)) that may program the processing unit 330 to implement the principles of the present invention. Alternatively, the one or more logic modules 340 may be hardware realized in the controller 325 (e.g., an application specific integrated-circuit (ASIC)) that implements the principles of the present invention. Other hardware, software, firmware, some combination thereof, etc. realization(s) of the one or more logic modules 340 are also alternatives within the scope of the present invention for controlling/effectuating the functions and/or operations of the network node 300, including those corresponding to the principles of the present invention.

Furthermore, the one or more logic modules 340 may also represent one or more other resources 345. The other resources 345 may alternatively be a physical device, such as a transceiver; a radio frequency (RF) transmission channel or a code-defined (e.g., in WCDMA systems) transmission channel, such as a traffic channel assignable to an MT 120; an Internet Protocol (IP) address from an IP address pool, etc. The other resources 345 may be connected to the bus 320. In RNCs, examples of other resources 345 include a Packet Data Router (PDR), a Common Channel (CC), a Regional Radio Connection (RRC), a Signaling Connection, a User Data Connection (e.g., a Radio Access Bearer (RAB)), etc.

As alluded to above, congestion in networks may be ameliorated by expansion. However, few services exist to aid expansion processes such as adding new RBS sites. Once a sufficient number of new RBSes have been added so that a new RNC is required, RBSes must be moved from being controlled by an old RNC to being controlled by a new RNC. Furthermore, due to miscalculations in planning, some RNCs are often lacking capacity while others have too much capacity. In both situations, one or more RBSes may be rehomed to one or more new RNCs to remedy the overcapacity. Advantageously, certain principles of the present invention facilitate an automatic, non-manual rehoming. In fact, in accordance with the present invention, a dynamic rehoming mechanism may be added to traffic procedures.

With continuing reference to FIG. 2, particular embodiments of the present invention may be implemented by adhering to certain assumptions. For example, when the rehoming operations are foreseen at configuration, required transport connections are provided and configured. Furthermore, if there are possible RNC-RBS compatibility problems (e.g., possible hardware/software incompatibility), this is fortuitously foreseen,at configuration. It should be noted that such compatibility problems would not be faced if the RNC-RBS interface were standardized. In the wireless network 100, a mobile connection 210 between the MSC 130 and the RBS12 110(1) may be established through the RNC1 115(1), which is the serving RNC. In accordance with the present invention, the control of the RBS12 110(1) may be moved over from the RNC1 115(1) to the RNC2 115(2) without disturbing the (ongoing) mobile connection 210. The mobile connection 210, for example, may be able to be composed of one or more "soft legs" from either only the RBS12 110(1) or from other RBSes 110 (which are connected to any RNC 115) without disturbing the principles of the present invention, as explained further hereinbelow. A "soft leg" or "radio link", as used herein, is the set of radio channels used by the radio connection for a given cell. When a radio connection uses several soft legs in WCDMA, for example, macrodiversity is applied. This macrodiversity implies that the data streams for the soft legs are combined and split in the respective MCS 215 and the MS 120.

Especially for certain embodiment(s) of the present invention, there are several relevant principles of the present invention. First, there is an instantaneous or nearly instantaneous take over from the resource control point of view. In other words, all control of the RBS 110 resources is handed over from an old BRH 220 to a new BRH 220 at the same time or at least approximately simultaneously. Second, there is a gradual take over of mobile connections. Ongoing mobile connections 210 are not affected by the rehoming procedure. Consequently, an old MCS 215 in charge of an ongoing mobile connection 210 remains in charge of the mobile connection until the old MCS 215 terminates the connection. However, new mobile connections are established by a new MCS 215. Third, the RNC 115 may initiate the rehoming procedure. The initiative may be based on internal performance measurements or an initiative from an RNC manager (e.g., an RNM 125). The performance measurements may be acquired, organized, and utilized by, for example, an OMA 225. Fourth, the RBS 110 is involved in the procedure. The RBS 110 is made aware that a new application session to a new BRH 220 is to be established.

Figure 4A:
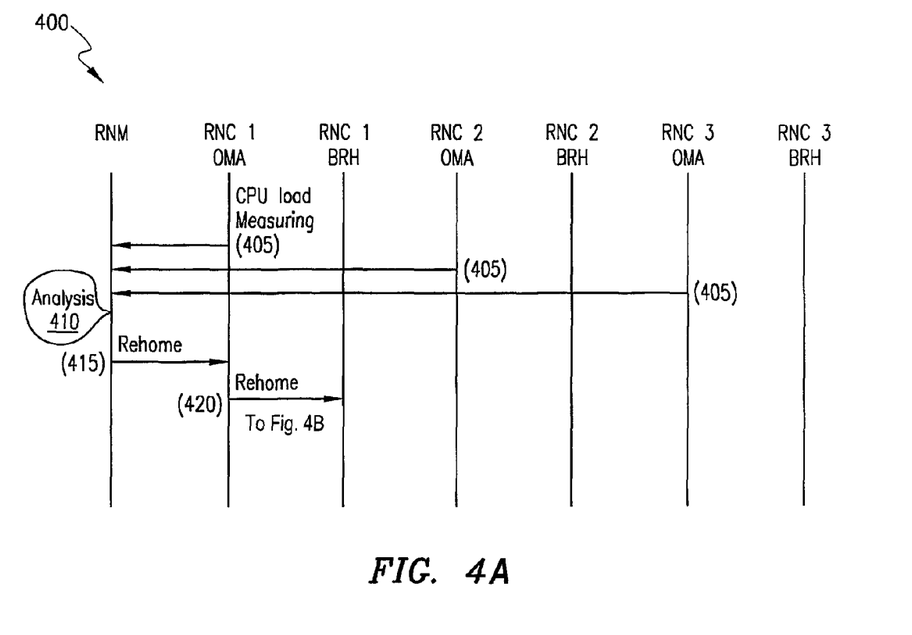
FIG. 4A illustrates an exemplary sequence diagram for automatically discovering an overload condition in accordance with the present invention.

With reference now to FIG. 4A, an exemplary sequence diagram for automatically discovering an overload condition in accordance with the present invention is illustrated generally at 400. The nodes of the exemplary sequence diagram 400 may correspond to, for example, the nodes of the wireless network 100 (of FIGS. 1 and 2). Certain embodiment(s) of the present invention advantageously provide for automatically selecting a "target RNC" for rehoming based on relative capacities of various RNCs, including whether or not a potential target RNC for rehoming has (sufficient) capacity available. In the exemplary sequence diagram 400, the OMAs of the RNC1, the RNC2, and the RNC3 send CPU load measuring reports (405) to a network performance management application in the RNM. The data in the CPU load measuring reports (405) may include, for example, the number of connection establishments plus the number of connection releases per unit of time. The network performance management application can collect the measurement reports, create statistics from the material, etc. For example, by low pass filtering the reports, the network performance management application can determine whether or not a load in a particular RNC is too high (e.g., by comparing a current measured load to operator-specified configuration data). It can also determine whether or not the wireless network would benefit by a rehome operation.

The RNM performs a rehoming analysis (410) by, for example, comparing the collected load statistics for the RNC1 with a load threshold introduced at system configuration or alternatively introduced sometime thereafter. If the load of the RNC1 exceeds the defined threshold, then the following further calculations are completed. Because the RNM can have the complete, overall picture of the wireless network configuration, it is possible to compare the load statistics of the RNC1 to the load statistics for other RNCs to determine one or more RNCs that may be potential substitutes for the RNC1. When the RNM discovers an RBS (e.g., the RBS12 110(1)) that is equipped with a double connection (e.g., to both the RNC1 115(1) and the RNC2 115(2)), then the RNM has also discovered a possible substitute (e.g., the RNC2 115(2)) for the RBS12 connection. The RNM preferably then decides whether the RNC2 has sufficient resources available to take over the connection to/from the RBS12. The RNM analyzes the measuring reports from RNC2 and compares them to a different load threshold introduced at system configuration or alternatively sometime thereafter. If the measured RNC2 load value is below this defined threshold, then the RNM may decide to substitute the RNC2 for the RNC1 for traffic from the RBS12.

When the RNM determines that the RNC2 should replace the RNC1 for RBS12 traffic, the RNM sends a rehome command (415) to the OMA of the RNC1. The rehome command (415) may include the network address of the RNC2 as data. The OMA of the RNC1 sends the rehome command (420) to the BRH of the RNC1 with the network address of the RNC2 as data. The BRH of the RNC1 may subsequently initiate an automatic rehoming procedure in accordance with the present invention, as described below with reference to FIG. 4B.

Figure 4B:
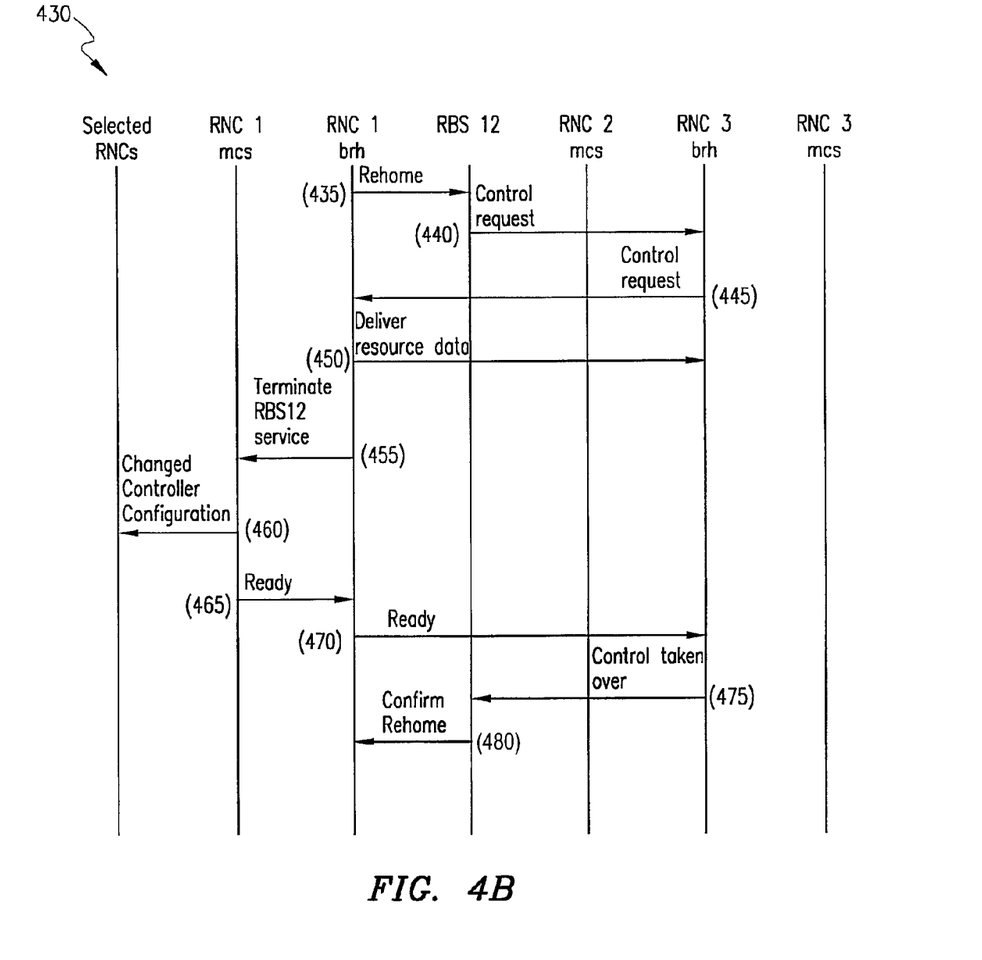
FIG. 4B illustrates an exemplary sequence diagram for initiation of the automatic rehoming procedure in accordance with the present invention.

With reference now to FIG. 4B, an exemplary sequence diagram for initiation of the automatic rehoming procedure in accordance with the present invention is illustrated generally at 430. The nodes of the exemplary sequence diagram 430 may correspond to, for example, the nodes of the wireless network 100 (of FIGS. 1 and 2). As alluded to hereinabove, a principle of certain embodiment(s) of the present invention relates to ensuring that the MCS of the RNC1, from the time that the switch occurs, only handles ongoing connections. In other words, the MCS of the RNC1 refuses any connection setups that are directed to the affected RBS. The MCS of the RNC1 does, however, respond to connection release requests that refer to the old cell identification (ID). It should be noted that an MSC of the wireless network 100 may be involved in a "rehoming" (a "rehoming" in the sense that an entry point for a whole location area is moved) after, for example, many RBSes have been rehomed.

In the exemplary sequence diagram 430, the rehome (435) is initiated by the BRH of the RNC1 (e.g., responsive to receiving the rehome (420) of FIG. 4A from the OMA of the RNC1), and data thereby sent to the RBS12 includes the network address of the RNC2. The control request (440) is sent from the RBS12 to the BRH of the RNC2; the control request (440) may include the network address of the RNC1. The BRH of the RNC2 responds by sending a control request (445) to the BRH of the RNC1. (no data need be included in the control request (445)). The BRH of the RNC1 next delivers resource data (450) to the BRH of the RNC2. The delivered resource data (450) may include a cell object with attributes such as: cell ID (RNC1—local cell ID), downlink power available, downlink power used (measured), downlink channels (codes), uplink interference maximum, uplink interference used (mean value, measured), neighbor relations, etc. It should be noted that, after the transmission of the resource data (450), the BRHs of both the RNC1 and the RNC2 are preferably updated with the measured values of the RBS12. Furthermore, the downlink channel codes, which are still used by the RNC1, are preferably not delivered to the RNC2 until the ongoing connection(s) is(are) terminated.

After delivering the resource data (450), the BRH of the RNC1 terminates the RBS12 service (455) by sending data that includes the old and the new GlobalCellIDs of all cell(s) controlled by the rehomed RBS12 to the MCS of the RNC1. For each connection maintained by an. MCS, that MCS stores an ActiveSet (e.g., the cells to which a mobile is connected in a soft handover) and a MonitoringSet (i.e., the cells that are potential members of the ActiveSet). Each of these sets are composed of a number of GlobalCellIDs. In this context, a GlobalCellID may be considered a concatenation of the controlling RNC ID and the Cell's ID. Consequently, when one or more cells become under the control of a different RNC (e.g., the RNC2 115(2)) (because the associated RBS (e.g., the RBS12 110(1)) has been rehomed), the GlobalCellID of these one or mote cells should be changed. These new GlobalCellIDs should be communicated to the MCS in charge of the relevant connection. This is important when, for example, there is a situation in which a new "leg" needs to be set up, and this new "leg" should use the resources of the "new" RNC. All MCSes of RNCs that keep an active set that includes the rehomed cell(s) update their connections (e.g., by updating the relevant ActiveSet and the relevant MonitoringSet). These MCSes also save a backup of the previous (old) connection data to be used at connection release.

The MCS of the RNC1 sends a message to (the MCSes of) selected RNCs that the RBS12 has changed controller configuration (460). The changed controller configuration (460) message includes the old and the new GlobalCellIDs of all cell(s) controlled by the rehomed RBS12. The selected RNCs include those RNCs that have cells that in the BRH of the RNC1 are defined as neighbors to the cell(s) controlled by the RBS12. It should be noted that, thereafter, the MSC 130 of the wireless network 100 (of FIGS. 1 and 2) should not direct new connections to the new GlobalCellID through the RNC1, but should instead direct new connections to the new GlobalCellID through the RNC2, the ID of which is now part of the new GlobalCellID.

The MCS of the RNC1 acknowledges the terminate (455) command with a ready (465) message that is sent to the BRH of the RNC1 (no data need be included in the ready (465) message). The BRH of the RNC1 acknowledges the control request (445) with a ready (470) message that is sent to the BRH of the RNC2. In response, the BRH of the RNC2 acknowledges the control request (440) with a control taken over (475) message that is sent to the RBS12, and the RBS12 confirms the rehome (480) to the BRH of the RNC1. It should be noted that, while not explicitly shown in the sequence diagram 430, neighbor cell lists that have affected cells registered as neighbors should be updated as well.

Figure 5:
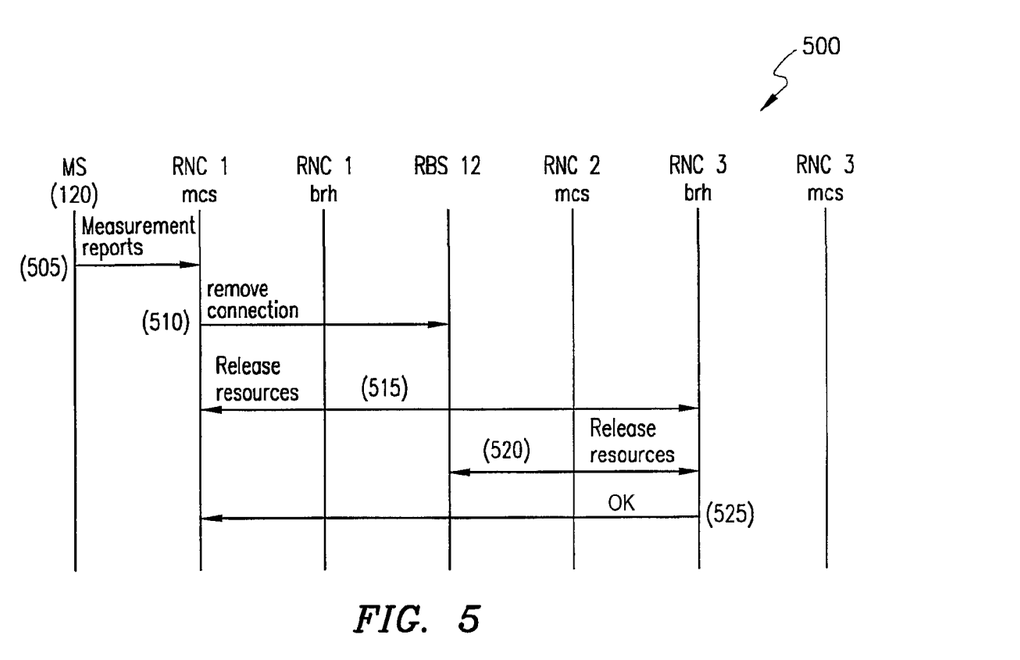
FIG. 5 illustrates an exemplary sequence diagram for disconnecting a leg of a transient connection in accordance with the present invention.

With reference now to FIG. 5, an exemplary sequence diagram for disconnecting a leg of a transient connection in accordance with the present invention is illustrated generally at 500. The nodes of the exemplary sequence diagram 500 may correspond to, for example, the nodes of the wireless network 100 (of FIGS. 1 and 2). The sequence diagram 500 relates to interactions between and among the various designated nodes for a connection that is being disconnected. For each connection the relevant MCS stores a cell object with connection data (e.g., the ActiveSet and the MonitoringSet) involved in the connection. While switching control of an RBS, each of the "old" cell objects are preferably stored for all ongoing connections. In other words, old cell objects preferably survive for an ongoing connection as long as the connection still exists (i.e., is ongoing).

In the exemplary sequence diagram 500, measurement reports (505) are sent from the MS 120 to the MCS of the RNC1. The MCS of the RNC1 thereafter decides to remove a leg from the active set, which is similar to the approach of the WCDMA standard. The data in the measurement reports (505) includes a scrambling code that defines the cell to which it is suggested to connect. The MCS of the RNC1 investigates the backed up ActiveSet (as described hereinabove with reference to the service termination (455) of FIG. 4B) to find the GlobalCellID corresponding to the received scrambling code. The MCS of the RNC1 is subsequently able to send a remove connection (510) message to the RBS12. The MCS of the RNC1 discovers that the GlobalCellID points to the BRH of the RNC2, so the RNC1 directs its remove connection request to the RNC2. Resources are released (515,520) with exchanges (i) between the MCS of the RNC1 and the BRH of the RNC2 (515) and (ii) between the BRH of the RNC2 and the RBS12 (520). This may be accomplished in a manner similar to the known approach for releasing RBS resources. Likewise, in a manner similar to an established approach, the BRH of the RNC2 may acknowledge the released connection from the drift RNC to the serving RNC with an OK (525) message that is transmitted from the BRH of the RNC2 to the MCS of the RNC1.

Figure 6:
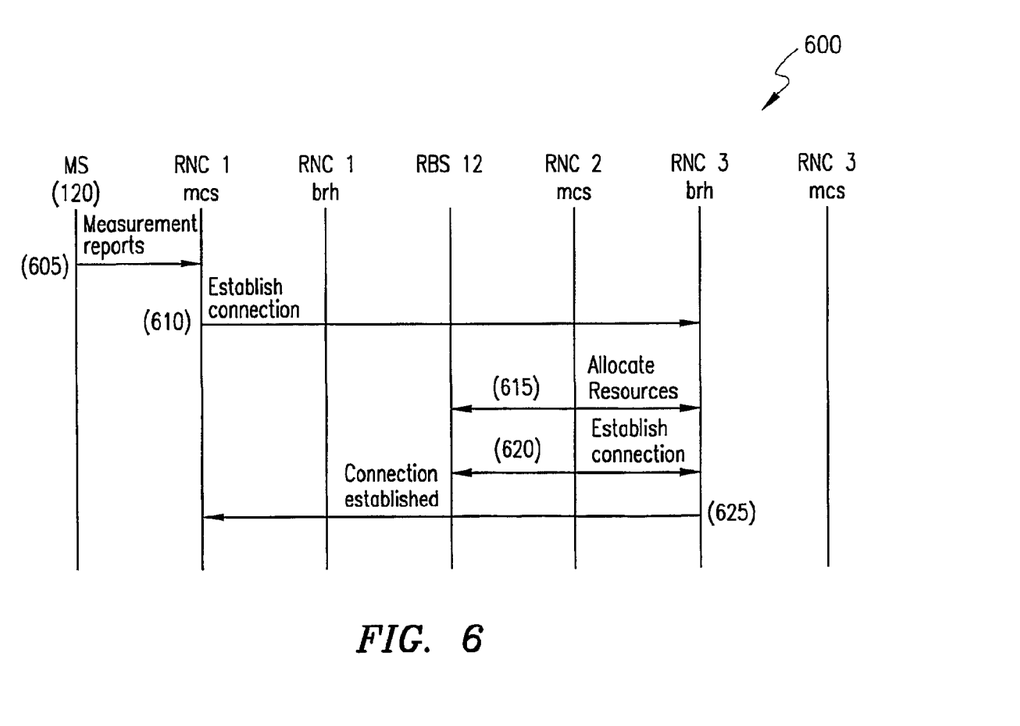
FIG. 6 illustrates an exemplary sequence diagram for establishing a new leg of a connection in accordance with the present invention.

With reference now to FIG. 6, an exemplary sequence diagram for establishing a new leg of an ongoing connection (e.g., a connection that existed when the rehoming command was issued) in accordance with the present invention is illustrated generally at 600. The nodes of the exemplary sequence diagram 600 may correspond to, for example, the nodes of the wireless network 100 (of FIGS. 1 and 2). The sequence diagram 600 relates to interactions between and among the various designated nodes for an ongoing connection. It is the (MCS of the) RNC1 that preferably takes the initiative to establish a new "leg" in an already existing connection.

In the exemplary sequence diagram 600, measurement reports (605) are sent from the MS 120 to the MCS of the RNC1. The MCS of the RNC1 thereafter decides to add a new leg to the active set, which is similar to the approach of the WCDMA standard. The data in the measurement reports (605) includes a scrambling code that defines the cell to which it is suggested to connect. The MCS of the RNC1 investigates its MonitoringSet to find the GlobalCellID corresponding to the received scrambling code. Because the GlobalCellID within the MonitoringSet of the connection has recently been updated (as alluded to hereinabove with reference to FIG. 4B), the RNC1 is able to direct its connection establishment (610) request to RNC2, which is now acting as a drift RNC. The MCS of the RNC1 therefore sends an establish connection (610) message to the BRH of the RNC2. In response thereto, the RBS12 and the BRH of the RNC2 exchange messages in order to allocate resources (615) and in order to establish a connection (620). The resource allocation (615) may be accomplished in a manner similar to the known approach for allocating RBS resources. Likewise, in a manner similar to an established approach, the BRH of the RNC2 acknowledges the new connection from the drift RNC to the serving RNC with a connection established (625) message that is transmitted from the BRH of the RNC2 to the MCS of the RNC1.

Figure 7A:
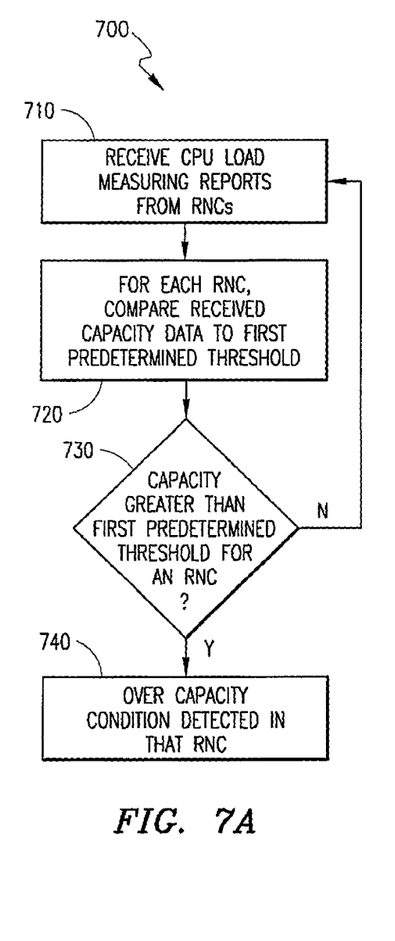
FIGS. 7A and 7B illustrate exemplary methods in flowchart form in accordance with the present invention.
Figure 7B:
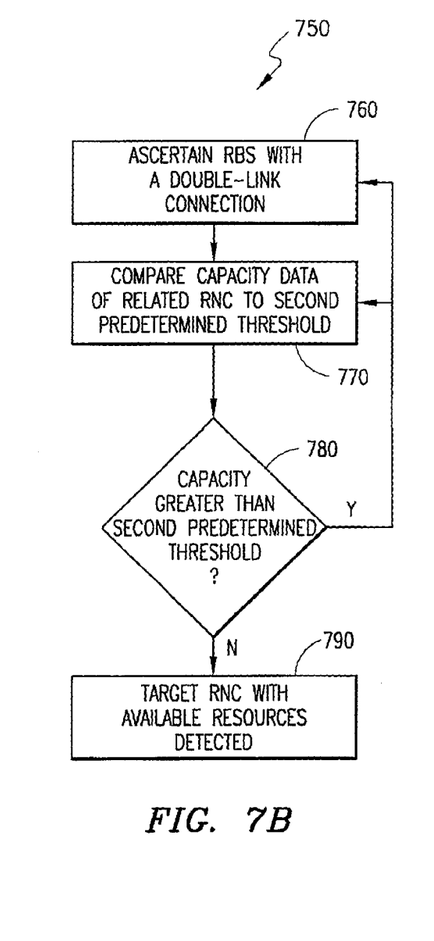

With reference now to FIGS. 7A and 7B, exemplary methods in flowchart form in accordance with the present invention are illustrated generally at 700 and 750, respectively. The flowchart 700 illustrates an exemplary automatic load discovery and overcapacity determination. A managing/controlling entity (e.g., the RNM 125) receives CPU load measuring reports from the RNCs (e.g., the RNCS 115(1,2, 3)) in the wireless network (step 710). For each RNC, the managing/controlling entity compares received capacity data (e.g., the number of connection establishments plus the number of connection releases per unit of time) from the CPU load measuring reports to a first predetermined threshold (step 720). From the comparison (of step 720), it is determined whether the capacity of any RNC is greater than the first predetermined threshold (step 730). If no received capacity data is greater than the first predetermined threshold for any RNC, then the managing/controlling entity awaits the reception of the next CPU load measurement reports (at step 710). If, on the other hand, the received capacity data is greater than the first predetermined threshold for one or more RNCs (at step 730), then the managing/controlling entity has detected an overcapacity condition in the relevant RNC(s).

The flowchart 750 illustrates an exemplary potential target RNC selection. Once a managing/controlling entity (e.g., the RNM 125) has determined that there is an overcapacity condition (e.g., as illustrated in the flowchart 700), a potential target RNC (e.g., the RNCs 115(1,2,3)) may be selected in order to select a target RNC for RBS (e.g., the RBS12 110(1)) rehoming or RNC resource sharing. In order to rehome an RBS or share resources, the managing/controlling entity ascertains an RBS that has at least a double-link connection, one link-connection of which is to the RNC with a detected overcapacity condition (e.g., the RBS12 110(1,) has a link connection to both the RNC1 115(1) and the RNC2 115(2), with one of the RNC1 115(1) and the RNC2 115(2) being an overloaded RNC 115) (step 760). For the related RNC(s) (e.g., the RNC(s) attached to the RBS with the double-link connection), the managing/controlling entity compares received capacity data (e.g., the number of connection establishments plus the number of connection releases per unit of time) from the CPU load measuring reports to a second predetermined threshold (step 770).

From the comparison (of step 770), it is determined whether the capacity of the related RNC is greater than the second predetermined threshold (step 780). If the received capacity data is greater than the second predetermined threshold for the related RNC (and thus already above a predefined capacity level), then the managing/controlling entity returns to compare capacity data of another RNC that is related to the RBS (e.g, if the RBS has a triple-link connection, a quadruple-link connection, etc.) (at step 770) or returns to ascertain another RBS with at least a double-link connection (at step 760). If, on the other hand, the received capacity data is not greater than the second predetermined threshold for the related RNC (and thus below the predefined capacity level) (at step 780), then the managing/controlling entity has detected a target RNC with available resources (step 790) for load sharing or RBS rehoming. It should be noted that flowcharts 700 and 750 are applicable at least to both the rehoming of an RBS and the sharing of resources between/among one or more RNCs.

Figure 8:
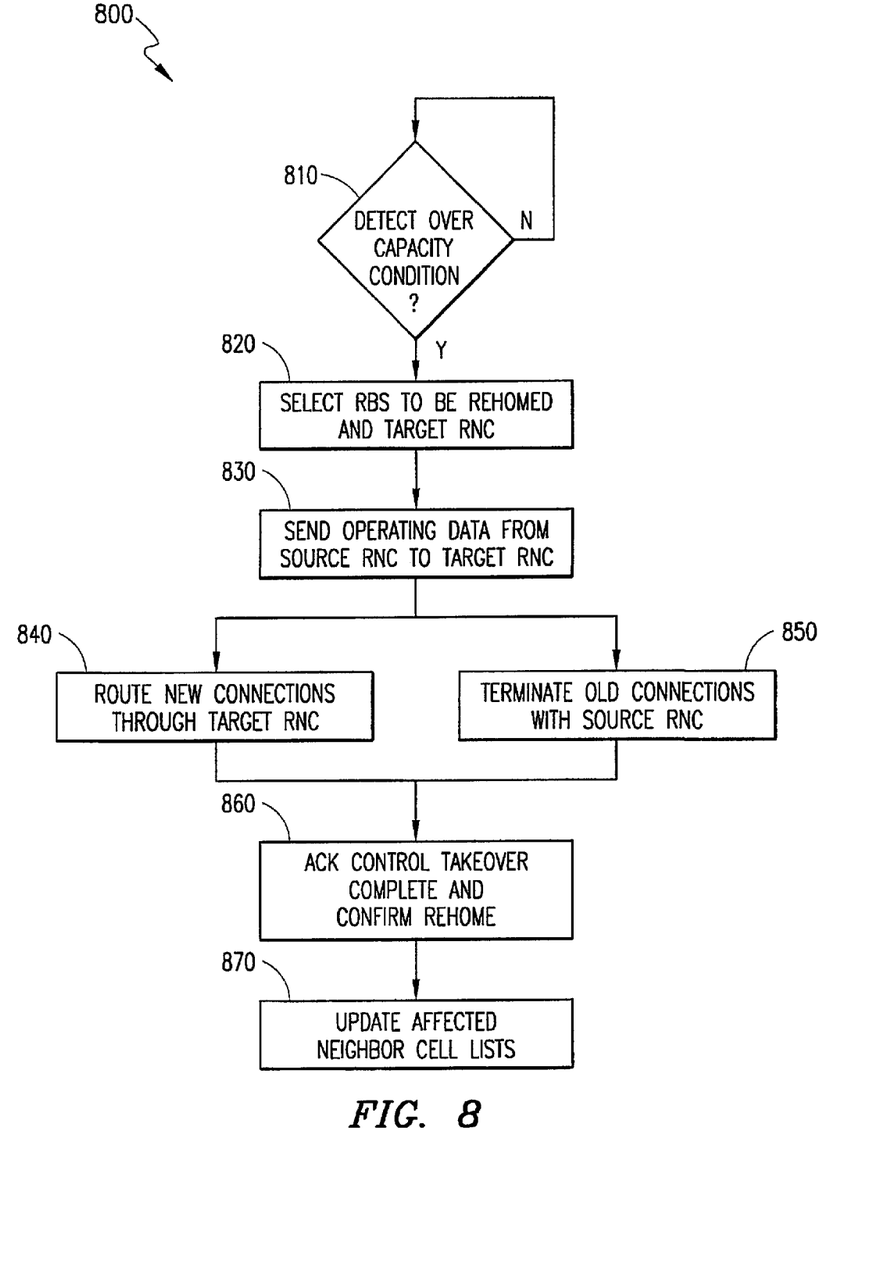
FIG. 8 illustrates another exemplary method in flowchart form in accordance with the present invention.

With reference now to FIG. 8, another exemplary method in flowchart form in accordance with the present invention is illustrated generally at 800. A logic module, for example, may be constantly running or may be activated only when high traffic periods are expected. When in operation, such a logic module, for example, may perform the steps of the flowchart 800 without manual intervention. It is detected whether an over capacity condition exists (step 810) by, for example, a method in accordance with FIG. 7A and related text. As an example, an RNC (e.g., the RNC1 115(1) of FIG. 2) having overcapacity may be controlling an RBS (e.g., the RBS12 110(1)) that may also be capable of being controlled by another RNC (e.g., the RNC2 115(2)).

If it is detected that an RNC (e.g., the RNC1 115(1)) does have overcapacity, then the RBS to be rehomed (e.g., the RBS12 110(1)) and the target RNC (e.g., the RNC2 115(2)) are selected (step 820). Selecting a target RNC with available resources may be accomplished by a method in accordance with FIG. 7B and related text. To enable the target RNC to control the selected RBS, operating data is sent from the source RNC (e.g., the RNC1 115(1)) to the target RNC (step 830). The operating data may include information that is necessary and/or desirable for controlling the selected RBS and may correspond to the resource data sent in transmission 450 (of FIG. 4B).

Once the target RNC has received the operating data and acknowledged to the source RNC that it is "ready" to begin taking control over of the selected RBS, new connections may be routed through the target RNC (step 840). Meanwhile, old preexisting connections, continue to be handled by the source RNC until such old connections are ultimately terminated (step 850). Once all of the old connections have been terminated, either or both of the RNCs may acknowledge that the control takeover process from the source RNC to the target RNC is complete, and the RBS may confirm that the rehoming procedure is complete (step 860). Cells/RBSes that are neighbors to the rehomed cell/RBS thereafter have their neighbor cell lists updated to reflect the results of the rehoming procedure (step 870).

In this exemplary manner in accordance with the principles of the present invention, an RBS may be automatically rehomed when an RNC that is controlling the RBS is experiencing overcapacity (e.g., there are more drains on the RNC's resources than are prudent to maintain a specified level of service and/or reserve capacity). Alternatively, the rehoming procedure may be effectuated when the respective loads on two RNCs that are both capable of controlling a single RBS are or become "merely" unbalanced (as opposed to an RNC actually reaching an overcapacity condition). In fact, such load balancing may be temporary or transient as a first RNC shares its resources to support a second RNC on a temporary basis (e.g., only) while the second RNC is in an overcapacity condition, as described below with reference to FIG. 9.

Figure 9:
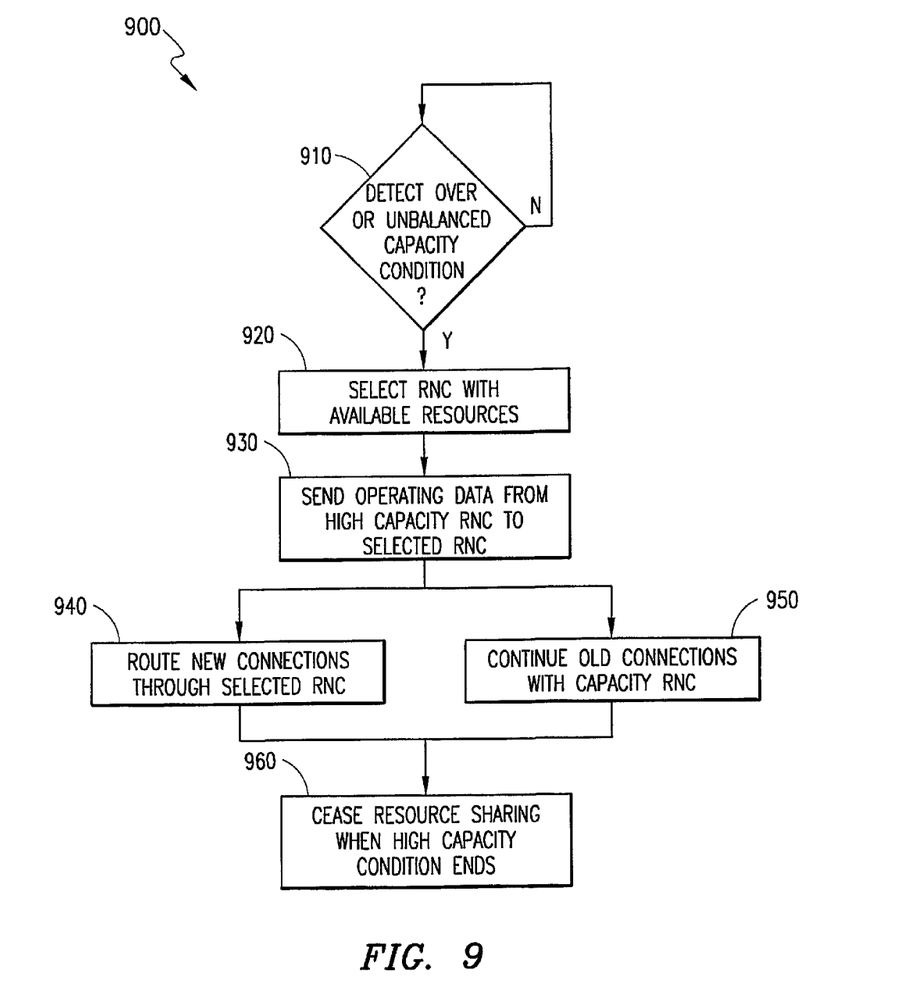
FIG. 9 illustrates yet another exemplary method in flowchart form in accordance with the present invention.

With reference now to FIG. 9, yet another exemplary method in flowchart form in accordance with the present invention is illustrated generally at 900. A logic module, for example, may be constantly running or may be activated only when high traffic periods are expected. When in operation, such a logic module, for example, may perform the steps of the flowchart 900 without manual intervention. It is detected whether an over or unbalanced capacity condition exists (step 910) by, for example, a method in accordance with FIG. 7A and related text. As an example, a first RNC (e.g., the RNC1 115(1) of FIG. 2) may have significantly greater connection capacity in use than does a second RNC (e.g., the RNC2 115(2)) and may be controlling an RBS (e.g., the RBS12 110(1)) that may also be capable of being controlled by the second RNC (i.e., the RNC2 115(2)). If it is detected that the first RNC (e.g., the RNC1 115(1)) does have more current connection capacity in use, then the RBS to be rehomed (e.g., the RBS12 110(1)) and the target RNC (e.g., the RNC2 115(2)) are selected (step 920). Selecting a target RNC with available resources may be accomplished by a method in accordance with FIG. 7B and related text. To enable the selected target RNC to control the selected double-linked RBS, operating data is sent from the high capacity RNC.(e.g., the RNC1 115(1)) to the selected target RNC (step 930). The operating data may include information that is necessary and/or desirable for controlling the selected double-linked RBS and may correspond to the resource data sent in transmission 450 (of FIG. 4B).

Once the selected target RNC has received the operating data and acknowledged to the high capacity RNC that it is "ready" to begin accepting at least a portion of the new connections to the selected double-linked RBS, at least some new connections may be routed through the selected target RNC (step 940). All new connections may be routed through the selected target RNC (e.g., the resources of the high capacity RNC are nearly depleted and the selected target RNC has significant available resources). Alternatively, only some new connections may be routed through the selected target RNC (e.g., the amount of resources of the higher capacity RNC that are in use are only somewhat greater than those of the selected target RNC that are in use). Meanwhile, old preexisting connections continue to be handled by the high capacity RNC until such old connections are ultimately terminated (step 950). While the resource sharing between the high capacity RNC and the selected target RNC is occurring, the wireless network (e.g., the RNM 125 (of FIGS. 1 and 2) using reports from OMAs 225 of the RNCs 115(1,2,3)) may be monitoring the relative capacities of each RNC, especially those RNCs currently sharing resources for a single RBS. Once the high capacity (e.g., the over or unbalanced capacity) condition ends, the resource sharing may cease (step 960).

In this exemplary manner in accordance with the principles of the present invention, resources needed to service connections through an RBS may be automatically shared between first and second RNCs when the first RNC (e.g., the RNC that "primarily" or "usually" controls the RBS) is experiencing overcapacity (e.g., there are more drains on the RNC's resources than are prudent to maintain a specified level of service and/or reserve capacity) or there exists an unbalanced capacity condition between the two RNCs (e.g., the percentage of resources occupied in first RNC is significantly greater than the percentage of resources in use in the second RNC). Because each RNC may rely on another RNC to handle temporary high capacity situations, load balancing in accordance with the present invention advantageously enables each individual RNC to be equipped with fewer resources. The cost of each RNC is therefore reduced, as is the cost of the overall wireless network. In effect, the RNCs do not need to be configured according to the maximum capacity of the underlying RBSes. They may be configured according to a statistical calculation that takes into account the available assistance of neighboring RNCs in cases of sudden influx of users into an area.

Although preferred embodiment(s) of the method, system, and apparatus of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method of load sharing between a plurality of radio network controllers (RNCs) in a radio telecommunications network, wherein each of the RNCs controls a plurality of radio base stations (RBSes), said method comprising the steps of:

receiving, at a radio network manager, a plurality of load measuring reports from the plurality of RNCs, the plurality of load measuring reports including a measure of the number of call connections handled by each RNC during a given time period;

determining whether any of the plurality of RNCs was overloaded at any time during the time period by determining whether, at any time during the time period, the number of call connections handled by each RNC was greater than a first predetermined threshold;

upon determining that a first RNC was overloaded, determining whether the first RNC was frequently or constantly overloaded during the time period;

upon determining that the first RNC was frequently or constantly overloaded during the time period, automatically transferring control of at least one RBS from the first RNC to a second RNC that was not overloaded; and upon determining that the first RNC was not frequently or constantly overloaded during the time period, automatically shifting a portion of the call connections being handled by the first RNC to a second RNC that was not overloaded.

2. The method of claim 1, wherein the step of shifting a portion of the call connections to a second RNC includes the steps of:

completing on-going call connections through a connection service in the first RNC; and during the step of completing, establishing new call connections through a connection service in the second RNC until the portion of call connections has been shifted.

3. The method of claim 1, wherein the number of call connections handled by each RNC is proportional to the number of connection establishments plus the number of connection releases per unit of time.

4. The method of claim 1, wherein the step of automatically transferring control of at least one RBS from the first RNC to a second RNC includes the steps of:

identifying at least one RBS having link connections to multiple RNCs;

identifying from the multiple RNCs, a second RNC having excess capacity;

providing data for resource control of connections for the identified RBS to the identified second RNC; and transferring control of the identified RBS to the identified second RNC.

5. The method of claim 4, wherein the step of identifying a second RNC having excess capacity includes identifying a second RNC for which the number of call connections handled by the second RNC did not exceed a second predetermined threshold during the time period, wherein the second predetermined threshold is less than the first predetermined threshold.

6. The method of claim 5, wherein the step of automatically shifting a portion of the call connections being handled by the first RNC to a second RNC includes shift a portion of the call connections that is proportional to the amount of excess capacity of the second RNC.

7. The method according to claim 4, wherein the data for resource control includes at least one of cell identification, downlink power available, measured downlink power used, downlink channel codes, maximum uplink interference, measured mean value uplink interference, and neighbor relations.

8. The method according to claim 1, further comprising updating neighbor cell lists of RBSes that are neighbors to the transferred RBS to reflect the results of the load sharing procedure.

9. A radio communications network having flexible radio network controller (RNC) resource use, comprising:

a plurality of radio base stations (RBSes);

a plurality of radio network controllers (RNCs), wherein each of the RNCs controls a portion of the plurality of RBSes; and a radio network manager that receives a plurality of load measuring reports from the plurality of RNCs, the plurality of load measuring reports including a measure of the number of call connections handled by each RNC during a given time period, said radio network manager including:

means for determining whether any of the plurality of RNCs was overloaded at any time during the time period by determining whether, at any time during the time period, the number of call connections handled by each RNC was greater than a first predetermined threshold;

means, responsive to a determination that, a first RNC was overloaded, for determining whether the first RNC was frequently or constantly overloaded during the time period;

means, responsive to a determination that the first RNC was frequently or constantly overloaded during the time period, for automatically transferring control of at least one RBS from the first RNC to a second RNC that was not overloaded; and means, responsive to a determination that the first RNC was not frequently or constantly overloaded during the time period, for automatically shifting a portion of the call connections being handled by the first RNC to a second RNC that was not overloaded.

10. A radio network manager for load sharing between a plurality of radio network controllers (RNCs) in a radio telecommunications network, wherein each of the RNCs controls a plurality of radio base stations (RBSes), said radio network manager comprising:

means for receiving a plurality of load measuring reports from the plurality of RNCs, the plurality of load measuring reports including a measure of the number of call connections handled by each RNC during a given time period;

means for determining whether any of the plurality of RNCs was overloaded at any time during the time period by determining whether, at any time during the time period, the number of call connections handled by each RNC was greater than a first predetermined threshold;

means, responsive to a determination that a first RNC was overloaded, for determining whether the first RNC was frequently or constantly overloaded during the time period;

means, responsive to a determination that the first RNC was frequently or constantly overloaded during the time period, for automatically transferring control of at least one RBS from the first RNC to a second RNC that was not overloaded; and means, responsive to a determination that the first RNC was not frequently or constantly overloaded during the time period, for automatically shifting a portion of the call connections being handled by the first RNC to a second RNC that was not overloaded.

\* \* \* \* \*